US009126159B2

(12) United States Patent
Kim et al.

(10) Patent No.: US 9,126,159 B2
(45) Date of Patent: Sep. 8, 2015

(54) MICROFLUIDIC UNIT, MICROFLUIDIC DISK, MICROFLUIDIC DISK SYSTEM, AND METHOD FOR BIOCHEMICAL ASSAYS

(71) Applicant: POSTECH ACADEMY-INDUSTRY FOUNDATION, Pohang-si (KR)

(72) Inventors: Dong Sung Kim, Pohang-si (KR); Sangmin Park, Busan (KR); Hyung Woo Kim, Pohang-si (KR); Moonwoo La, Chuncheon-si (KR); Sungjea Park, Incheon (KR)

(73) Assignee: POSTECH ACADEMY-INDUSTRY FOUNDATION, Pohang-Si (KR)

( * ) Notice: Subject to any disclaimer, the term of this patent is extended or adjusted under 35 U.S.C. 154(b) by 88 days.

(21) Appl. No.: 13/795,090

(22) Filed: Mar. 12, 2013

(65) Prior Publication Data

US 2014/0199776 A1 Jul. 17, 2014

(30) Foreign Application Priority Data

Jan. 16, 2013 (KR) ........................ 10-2013-0005102

(51) Int. Cl.

| | |
|---|---|
| ***B01L 3/00*** | (2006.01) |
| ***G01N 35/00*** | (2006.01) |
| ***B01F 5/06*** | (2006.01) |
| ***B01F 13/00*** | (2006.01) |
| ***B01F 15/02*** | (2006.01) |

(52) U.S. Cl.

CPC ........... *B01F 5/0647* (2013.01); *B01F 13/0059* (2013.01); *B01F 15/0233* (2013.01); *B01L 3/502707* (2013.01); *B01L 3/50273* (2013.01); *B01L 2200/0605* (2013.01); *B01L 2300/0803* (2013.01); *B01L 2300/0874* (2013.01); *B01L 2300/0883* (2013.01); *B01L 2400/0409* (2013.01); *Y10T 436/25* (2015.01)

(58) Field of Classification Search

None

See application file for complete search history.

(56) References Cited

U.S. PATENT DOCUMENTS

| | | | | |
|---|---|---|---|---|
| 2004/0259237 | A1 * | 12/2004 | Kellogg et al. | 435/287.1 |
| 2005/0153434 | A1 * | 7/2005 | Andersson et al. | 435/287.2 |
| 2006/0073082 | A1 * | 4/2006 | Ducree et al. | 422/103 |
| 2009/0181412 | A1 * | 7/2009 | Cho et al. | 435/10 |
| 2010/0175994 | A1 * | 7/2010 | Lee et al. | 204/416 |

FOREIGN PATENT DOCUMENTS

| | | |
|---|---|---|
| KR | 10-2008-0089835 | 10/2008 |
| KR | 10-2010-0041664 | 4/2010 |
| KR | 10-2012-0059423 | 6/2012 |

OTHER PUBLICATIONS

Moonwoo La, et al., "A Disposable Lab-on-a-disk with Micro/Macro Structures Fabricated by Injection molding and Polymer Thermal Bonding", Proceedings of the 7th International Conference on MicroManufacturing, pp. 378-381 (ICOMM 2012 No. 117) (Mar. 12, 2012).

* cited by examiner

*Primary Examiner* — Jill Warden
*Assistant Examiner* — Timothy G Kingan
(74) *Attorney, Agent, or Firm* — Lex IP Meister, PLLC

(57) ABSTRACT

A microfluidic disk includes: a disk-shaped main body; a receiving container; an injection channel; a mixing channel; a reaction container; and a discharge container.

17 Claims, 9 Drawing Sheets

(d)

(e)

(f)

MICROFLUIDIC UNIT, MICROFLUIDIC DISK, MICROFLUIDIC DISK SYSTEM, AND METHOD FOR BIOCHEMICAL ASSAYS

CROSS-REFERENCE TO RELATED APPLICATION

This application claims priority to and the benefit of Korean Patent Application No. 10-2013-0005102 filed in the Korean Intellectual Property Office on Jan. 16, 2013, the entire contents of which are incorporated herein by reference.

BACKGROUND OF THE INVENTION (a) Field of the Invention

The present invention relates to a microfluidic unit, a microfluidic disk, a disk-type microfluidic system, and a method for biochemical assays, and more particularly, to a microfluic unit, a microfluidic disk, a disk-type microfluidic system, and a method for biochemical assays for treating a micro fluid.

(b) Description of the Related Art

In general, a biochemical assay using a specimen, such as plasma and serum, is performed through equipment or a device appropriate to an object. Basically, an appropriate amount of specimen and a reagent for a biochemical assay are mixed to induce a reaction, and then photometric or colorimetric of a mixed liquid for a specific wavelength of an ultraviolet ray region or a visible ray region is measured. Through this, a quantitative analysis for a specific biochemical material, such as ions and protein, present in plasma is performed.

Such a series of processes is performed through dedicated equipment, so that it is advantageously possible to perform a thorough examination, but has a problem in that a great quantity of blood is used in order to identify a biochemical material in a specimen.

Further, the series of processes are advantageous to a standardized examination for a plurality of specimens, such as a plurality of plasma by operation efficiency of the dedicated equipment, but have a disadvantage that efficiency thereof for various biochemical assays of a specific specimen, such as specific plasma, deteriorates.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a microfluidic unit, a microfluidic disk, a disk-type microfluidic system, and a method for biochemical assays, which perform various biochemical assays for specimens while using a small quantity of specimens.

A first exemplary embodiment of the present invention provides a microfluidic disk including: a disk-shaped main body self-rotating based on a center axis; a receiving container positioned between the center axis and an outline of the disk-shaped main body, recessed from a surface of the disk-shaped main body to have an opening at an upper side and a blocking plate for blocking one region of the opening at an upper side thereof; an injection channel communicating with a lower side of the receiving container, and extended in a direction of the outline from the disk-shaped main body from an inside of the receiving container; a mixing channel communicating with the injection channel, and bent at least one time to be extended in the direction of the outline of the disk-shaped main body; a reaction container positioned between the mixing channel and the outline of the disk-shaped main body, and having one portion communicating with the mixing channel; and a discharge container communicating with the other portion of the reaction container.

The blocking plate may be positioned at a side of the outline of the disk-shaped main body in an entire region of the opening.

The blocking plate may block a ⅓ region to ⅔ region in the entire region of the opening.

The opening may be an inlet through which a micro fluid is injected.

The microfluidic disk may further include an air outlet connected with the discharge container.

Further, a second exemplary embodiment of the present invention provides a microfluidic unit, including: a receiving container including an opening a blocking plate configured to block one region of the opening at an upper side thereof; an injection channel communicating with a lower side of the receiving container, and extended outwardly from an inside of the receiving container; a mixing channel communicating with the injection channel and bent at one time to be extended; a reaction container having one portion communicating with the mixing channel; and a discharge container communicating the other portion of the reaction container.

Further, a third exemplary embodiment of the present invention provides a disk-shaped microfluidic system including the microfluidic disk.

Further, a fourth exemplary embodiment of the present invention provides a method for a biochemical assay, including: providing the disk-shaped microfluidic system; injecting a specimen and a reagent in the receiving container through the opening; mixing the specimen and the reagent injected in the receiving container through the mixing channel by rotating the disk-shaped main body at a predetermined rotation angular velocity to position a mixture in the reaction container; and analyzing the mixture positioned in the reaction container.

The analyzing of the mixture may be performed by measuring photometric or colorimetric of the mixture after a predetermined time passes so that the specimen and the reagent are reacted.

Further, a fifth exemplary embodiment of the present invention provides a microfluidic disk, including: a disk-shaped main body self-rotating in a rotation direction based on center axis; an inject formed in the disk-shaped main body while being adjacent to the center axis, through which a micro fluid is injected from the outside; a distribution channel extended in the rotation direction from the inlet while maintaining a predetermined distance from the center axis, through which the micro fluid passes; a measuring container extended in a direction of an outline of the disk-shaped main body from the distribution channel and configured to receive the micro fluid at a predetermined volume; a micro valve connected to an end of the measuring container, of which open and close is adjusted in response to a rotation angular velocity of the disk-shaped main body; a waste water container connected to an end of the distribution channel and configured to receive the micro fluid; a receiving container connected with the micro valve to be positioned between the distribution channel and the outline of the disk-shaped main body to receive the micro fluid passing through the micro valve, and recessed from a surface of the disk-shaped main body to include an opening and a blocking plate configured to block one portion of the opening at an upper side thereof; an injection channel communicating with a lower side of the receiving container, and extended in a direction of the outline of the disk-shaped main body from an inside the receiving container; a mixing channel communicating with the injection channel, and bent one or more times to be extended in the direction of the outline of the disk-shaped main body; a reaction container positioned between the mixing channel and the outline of the disk-shaped main body, and having one portion communicating with the mixing channel; and a discharge container communicating with the other portion of the reaction container.

The micro valve connected with the receiving container may have an end shaped like a fan.

The micro valve may be closed when the disk-shaped main body rotates at a first rotation angular velocity, and may be opened when the disk-shaped main body rotates at a second rotation angular velocity larger than the first rotation angular velocity.

The microfluidic disk may further include an air outlet connected to each of the waste water container and the discharge container.

The number of measuring containers may be plural, and each of the plurality of measuring containers may be spaced apart from each other at a predetermined interval to be extended from the distribution channel.

Further, a sixth exemplary embodiment of the present invention provides a disk-shaped microfluidic system comprising the microfluidic disk.

Further, a seventh exemplary embodiment of the present invention provides a method for a biochemical assay, including: providing the disk-shaped microfluidic system; injecting a specimen in the inlet; measuring the specimen by rotating the disk-shaped main body at a first rotation angular velocity so that the specimen passes through the distribution channel from the inlet to be positioned only in the measuring container; receiving the measured specimen in the receiving container by opening the micro valve by rotating the disk-shaped main body at a second rotation angular velocity larger than the first rotation angular velocity; injecting a reagent in the receiving container through the opening; mixing the specimen and the reagent injected in the receiving container through the mixing channel by rotating the disk-shaped main body at a predetermined third rotation angular velocity to position a mixture in the reaction container; and analyzing the mixture positioned in the reaction container.

The analyzing of the mixture may be performed by measuring photometric or colorimetric of the mixture after a predetermined time passes so that the specimen and the reagent are reacted.

According to the exemplary embodiments of the present invention, it is possible to provide the microfluidic unit, the microfluidic disk, the disk-shaped microfluidic system, and a biochemical assay method using a tiny amount of specimens and simultaneously performing various biochemical assays on the specimen.

DETAILED DESCRIPTION OF THE EMBODIMENTS

Figure 1:
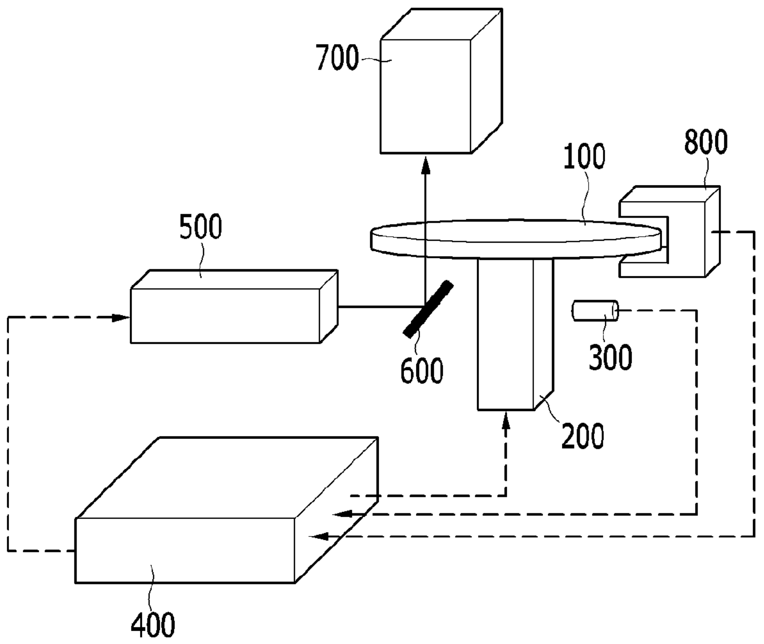
FIG. 1 is a diagram illustrating a disk type microfluidic system according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Further, the size and thickness of each configuration shown in the drawings are arbitrarily shown for understanding and ease of description, but the present invention is not limited thereto.

In addition, unless explicitly described to the contrary, the word “comprise” and variations such as “comprises” or “comprising”, will be understood to imply the inclusion of stated elements but not the exclusion of any other elements.

Hereinafter, a disk type microfluidic system according to a first exemplary embodiment of the present invention will be descried with reference to FIG. 1.

FIG. 1 is a diagram illustrating the disk type microfluidic system according to the first exemplary embodiment of the present invention.

As illustrated in FIG. 1, the disk type microfluidic system according to the first exemplary embodiment of the present invention simultaneously treats a micro fluid and identifies a flow state of the micro fluid, and includes a microfluidic disk 100, a driving unit 200, a sensor 300, a controller 400, an illumination unit 500, a mirror 600, a photographing unit 700, and a measurement unit 800.

The microfluidic disk 100 may be a microfluidic disk according to a second exemplary embodiment of the present invention to be described below or a microfluidic disk according to a fourth exemplary embodiment of the present invention to be described below, and the microfluidic disk according to the second exemplary embodiment of the present invention to be described below or the microfluidic disk according to the fourth exemplary embodiment of the present invention will be described below.

The driving unit 200 supports the microfluidic disk 100, and includes a driving means, such as a motor, to rotate the microfluidic disk 100.

The sensor 300 is adjacent to the microfluidic disk 100, and serves to sense the number of rotation of the microfluidic disk 100.

The controller 400 is connected to the sensor 300 and the driving unit 200, and serves to adjust rotation of the microfluidic disk 100 by the driving unit 200 by receiving a signal from the sensor 300 sensing the number of rotation of the microfluidic disk 100. A rotation angular velocity of the microfluidic disk 100 may be adjusted by the controller 400. The controller 400 may be connected to a display device (not illustrated), and control information controlled by the controller 400 and analysis information transmitted by the measurement unit 800 may be displayed on the display device.

The illumination unit 500 is connected to the controller 400, and is synchronized with the number of rotation of the microfluidic disk 100 to illuminate lighting to the mirror 600 in a form of flash.

The mirror 600 is positioned under the microfluidic disk 100, and reflects the lighting irradiated from the illumination unit 500 in a direction of the microfluidic disk 100.

The photographing unit 700 is positioned above the microfluidic disk 100 in correspondence to the mirror 600, and is synchronized with the number of rotation of the microfluidic disk 100 to photograph an inside of the microfluidic disk 100 per hour by using the lighting.

The measurement unit 800 performs a quantitative analysis by measuring photometric or colorimetric of the micro fluid through the inside of the microfluidic disk 100, and transmits an analysis result to the controller 400. The analysis result measured by the measurement unit 800 may be used as a biochemical assay result.

Hereinafter, the microfluidic disk 100 according to the second exemplary embodiment of the present invention will be described with reference to FIGS. 2 to 4.

Figure 2:
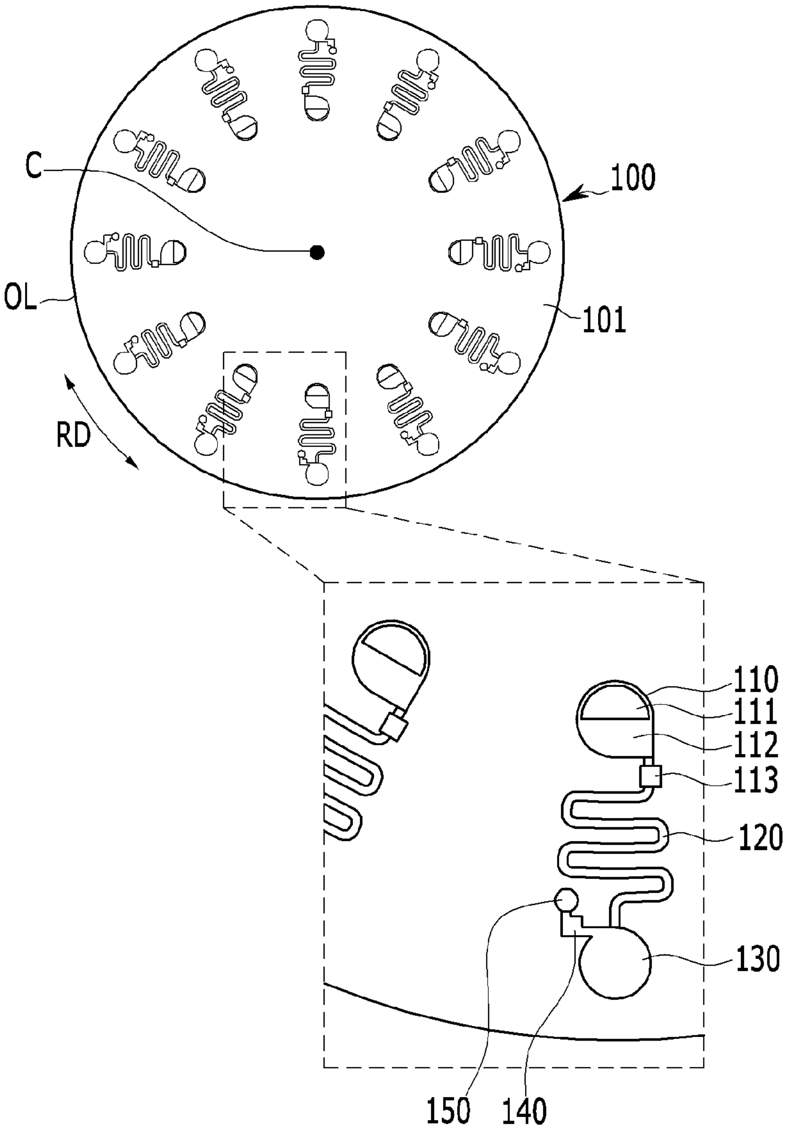
FIG. 2 is a diagram illustrating a microfluidic disk according to a second exemplary embodiment of the present invention.

FIG. 2 is a diagram illustrating the microfluidic disk according to the second exemplary embodiment of the present invention. FIG. 3 is a diagram illustrating a microfluidic unit formed in the microfluidic disk according to the second exemplary embodiment of the present invention. FIG. 4 is a cross-sectional view taken along line IV-IV of FIG. 3.

Figure 3:
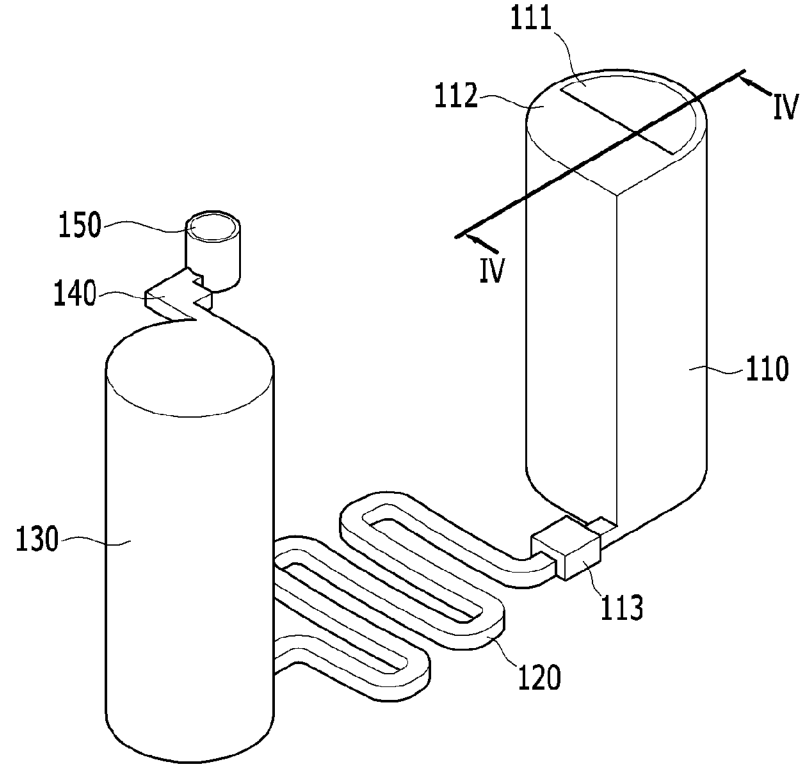
FIG. 3 is a diagram illustrating a microfluidic unit formed in the microfluidic disk according to the second exemplary embodiment of the present invention.
Figure 4:
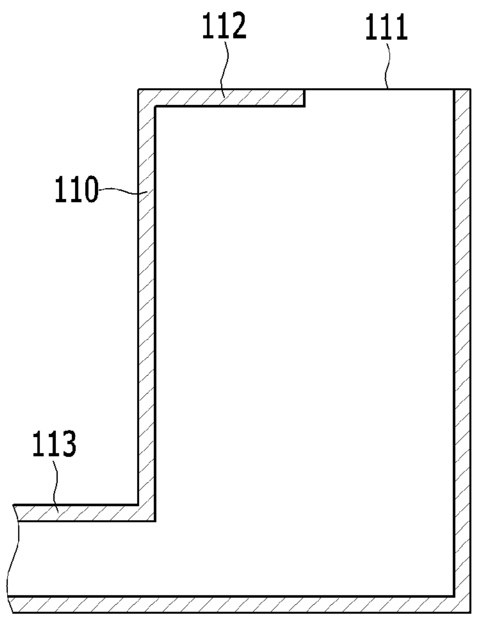
FIG. 4 is a cross-sectional view taken along line IV-IV of FIG. 3.

As illustrated in FIGS. 2 to 4, the microfluidic disk 100 includes a disk-shaped main body 101, a receiving container 110, an injection channel 113, a mixing channel 120, a reaction container 130, a discharge container 140, an air outlet 150.

The disk-shaped main body 101 has a circular disk shape, and self rotates along a rotation direction RD based on a center axis C. Rotation of the disk-shaped main body 101 may be driven by the driving unit 200, and a rotation angular velocity thereof may be controlled by the controller 400.

The disk-shaped main body 101 is provided with the receiving container 110, the injection channel 113, the mixing channel 120, the reaction container 130, the discharge container 140, and the air outlet 150, and the receiving container 110, the injection channel 113, the mixing channel 120, the reaction container 130, the discharge container 140, and the air outlet 150 may be intaglioed in the disk-shaped main body 101 by a producing method, such as photolithography, injection molding using the MEMS technology, such as precision micromachining, or a mold insert having an opposite shape, such as relief, hot embossing, UV molding, and casting. The disk-shaped main body 101 may be formed of a polymeric material, such as a metal material, a ceramic material or cyclic olefin copolymer (COC), polymethylmethacrylate (PMMA), polystyrene (PS), polycarbonate (PC), polydimethylsiloxane (PDMS), polytetrafluoroethylene (Teflon), and polyvinylchloride (PVC). The receiving container 110, the injection channel 113, the mixing channel 120, the reaction container 130, the discharge container 140, and the air outlet 150 functions as one microfluidic unit in which the micro fluid flows, and a plurality of microfluidic unit may be disposed along an outline OL of the disk-shaped main body 101.

Further, the microfluidic unit including the receiving container 110, the injection channel 113, the mixing channel 120, the reaction container 130, the discharge container 140, and the air outlet 150 is not limited to the disk-shaped main body according to another exemplary embodiment, and may be formed in a driving main body implementing various driving force. Here, the driving force means physical force, and the physical force includes centrifugal force and Coriolis's force by the rotation of the microfluidic unit, as well as pressure, gravity, and electromagnetic force generally applicable to the microfluidic unit.

The receiving container 110 is formed inside the disk-shaped main body 101, and is a space for receiving the micro fluid injected from the outside. The receiving container 110 is positioned between the center axis C and the outline OL of the disk-shaped main body 101. The receiving container 110 is depressed from a surface of the disk-shaped main body 101 to form the receiving space in which the micro fluid is received, and includes an opening 111 and a blocking plate 112 positioned at an upper side of the receiving space.

The opening 111 is an inlet in which the micro fluid is injected, and the micro fluid is injected from the outside through the opening 111 so that the micro fluid is received in the receiving space.

The blocking plate 112 is positioned at an upper side of the receiving container 110, and blocks one region among the entire regions of the opening 111. The blocking plate 112 is positioned at a side of the outline OL of the disk-shaped main body 101 among the entire regions of the opening 111. Particularly, the blocking plate 112 is positioned in a region far from the center axis C of the disk-shaped main body 101 compared to the opening 111 that is the inlet in which the micro fluid is injected, and the opening 111 of which a part is blocked by the blocking plate 112 is positioned in a region close to the center axis C of the disk-shaped main body 101 compared to the blocking plate 112. The blocking plate 112 is positioned in a region close to the injection channel 113 among the entire regions of the opening 111. Particularly, the blocking plate 112 is adjacent to the opening 111 that is the inlet in which the micro fluid is injected to be positioned at the region close to the injection channel 113, and the opening 111 of which a part is blocked by the blocking plate 112 is positioned in the region far from the injection channel 113, compared to the blocking plate 112.

In the meantime, in another exemplary embodiment of the present invention, the blocking plate 112 may block a ⅓ region to a ⅔ region, or another fraction of the region among the entire regions of the opening 111.

The receiving container 110 may receive the specimen and the reagent which are the micro fluids injected from the outside through the opening 111. In this case, the specimen and the reagent may be injected in the receiving container 110 through the opening 111 at a constant pressure by using a pipet, a cartridge, a pneumatic pump, and the like. Further, the specimen and the reagent may be injected in the receiving container 110 through another microfluidic unit communicating with the receiving container 110.

In the meantime, in the second exemplary embodiment of the present invention, a transverse section of the receiving container 110 has a circular shape, but in another exemplary embodiment of the present invention, a transverse section of the receiving container may have a shape including various polygons, such as a triangle and a quadrangle, and an ellipsoidal shape.

The injection channel 113 communicates with a lower side of the receiving container 110, is extended in a direction of the outline of the disk-shaped main body from an inside of the receiving container 110. The injection channel 113 is a passage through which the specimen and the reagent, which are the micro fluids received in the receiving container 110, are transferred.

The mixing channel 120 communicates with the injection channel 113, and is bent one or more times to be extended in the direction of the outline OL of the disk-shaped main body 101. The mixing channel 120 is connected with the injection channel 113, and mixes the specimen and the reagent passing through the injection channel 113 from the receiving container 110. A course of the mixing channel 120 is formed to be winding to mix the specimen and the reagent, as well as to transfer the specimen and the reagent passing through the injection channel 113 to a next step.

A transverse section of the mixing channel 120 in the second exemplary embodiment of the present invention has a quadrangular shape, but a transverse section of the mixing channel in another exemplary embodiment of the present invention may have a shape including a polygonal shape, such as a triangle, or a circular shape.

The reaction container 130 is positioned between the mixing channel 120 and the outline OL of the disk-shaped main body 101, and a part thereof communicates with the mixing channel 120. The reaction container 130 is connected to an end of the mixing channel 120, and receives a mixture of the specimen and the reagent passing through the mixing channel 120.

A transverse section of the reaction container 130 in the second exemplary embodiment of the present invention has a circular shape, but a transverse section of the reaction container 130 in another exemplary embodiment of the present invention may have a shape including a polygonal shape, such as a triangle or a quadrangle, or an ellipsoidal shape.

The discharge container 140 communicates with the other portion of the reaction container 130. The discharge container 140 is adjacently connected with the mixing channel 120 in the reaction container 130, and receives a mixture excessively received in the reaction container 130.

In the second exemplary embodiment of the present invention, the discharge container 140 is connected to an upper side of the reaction container 130, but the discharge container 140 in another exemplary embodiment of the present invention may be connected to a lower side or a center side of the reaction container 130.

The air outlet 150 is connected with the discharge container 140. The air outlet 150 is a passage through which air occupied in the aforementioned respective containers and channels included in the microfluidic unit is discharged when the specimen or the reagent, which are the micro fluids, are supplied to the microfluidic unit. The air outlet 150 allows the air present in the channel or the container to be smoothly discharged during the flow of the specimen and the reagent so that the specimen and the reagent may smoothly flow in the aforementioned channel and container.

Hereinafter, a biochemical assay method according to a third exemplary embodiment of the present invention will be described with reference to FIG. 5. The biochemical assay method according to a third exemplary embodiment of the present invention may be performed by using the disk-shaped microfluidic system according to the first exemplary embodiment of the present invention including the microfluidic disk according to the second exemplary embodiment of the present invention.

Figure 5:
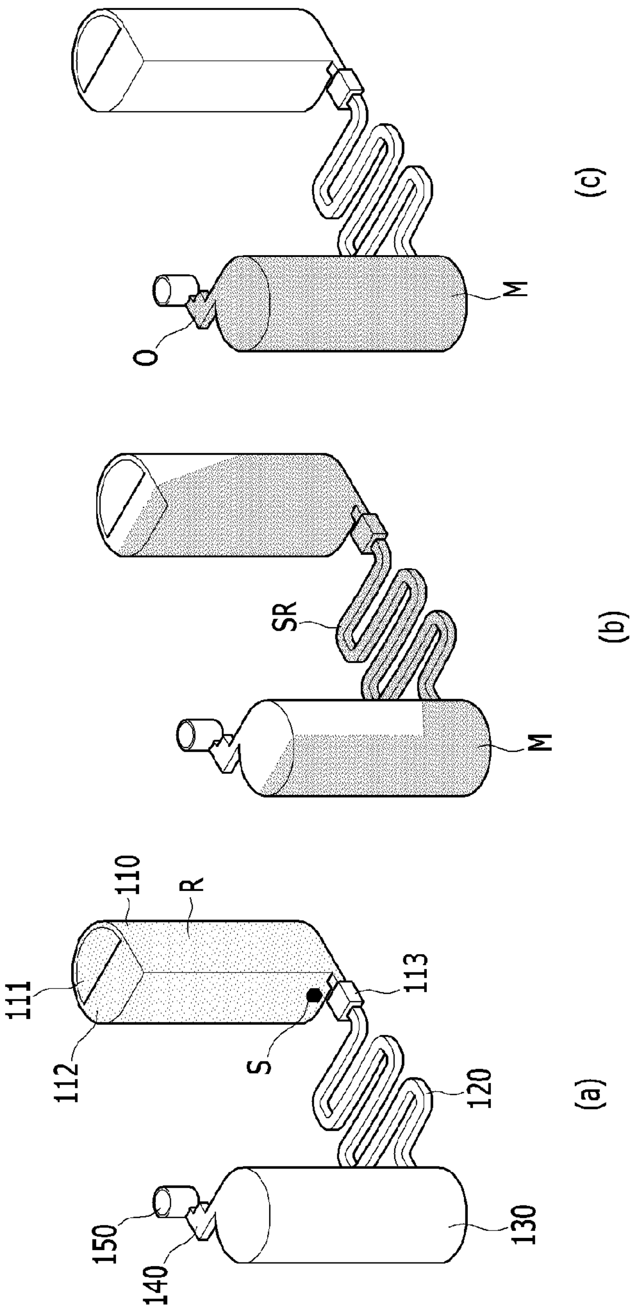
FIG. 5 is a diagram illustrating a biochemical assay method according to a third exemplary embodiment of the present invention.

FIG. 5 is a diagram illustrating the biochemical assay method according to a third exemplary embodiment of the present invention.

First, the disk-shaped microfluidic system according to the first exemplary embodiment of the present invention including the microfluidic disk according to the second exemplary embodiment of the present invention is provided.

Next, as illustrated in FIG. 5A, a specimen S and a reagent R for the biochemical assay are injected in the receiving container 110 through the opening 111.

Particularly, the specimen/reagent SR is injected to the receiving space inside the receiving container 110 through the opening 111 by using a device, such as a syringe and a pipet, or is injected in the receiving space inside the receiving container 110 through the opening 111 in a form of droplet by using an automatic distributor and the like.

Next, as illustrated in FIG. 5B, the disk-shaped main body 101 is rotated at a predetermined rotation angular velocity.

Particularly, the specimen/reagent SR injected in the receiving container 110 is mixed through the mixing channel 120 by rotating the disk-shaped main body 101 at the predetermined rotation angular velocity, so that a mixture M is positioned in the reaction container 130. The specimen/reagent SR injected in the receiving container 110 leans in a direction far from the center axis by centrifugal force induced by the rotation of the disk-shaped main body 101 at the predetermined rotation angular velocity in the rotation direction RD based on the center axis C. In this case, the specimen/reagent SR positioned at an upper end of the receiving container 110 tends to overflow into the outside of the receiving container 110 by the leaning phenomenon, but flowage of the specimen/reagent SR is prevented by the blocking plate 112 positioned at the upper side of the receiving container 110. The specimen/reagent SR positioned at a lower end of the receiving container 110 is discharged through the injection channel 113 connected to the receiving container 110 by the leaning phenomenon.

That is, pressure or electromagnetic force may be applied from the outside or the microfluidic unit is self-rotated based on the center axis to induce centrifugal force, so that the specimen/reagent SR received inside the receiving container 110 is injected to the mixing channel 120 through the injection channel 113 connected to the receiving container 110. The specimen/reagent SR injected to the mixing channel 120 through the injection channel 113 in the receiving container 110 is mixed together while passing through the mixing channel 120. The mixture M of the mixed specimen/reagent SR is received in the reaction container 130 connected to an end of the mixing channel 120.

Further, a 3D stirring phenomenon is generated while the specimen and the reagent rapidly flow in a corner channel in the winding passage of the mixing channel 120, so that mixing of the specimen/reagent SR is induced. Further, when the mixture M is received in the reaction container 130 connected to the end of the mixing channel 120, the previously received mixture M and dispensed specimen/reagent SR collide with each other while the specimen/reagent SR is dispensed from the mixing channel 120 to the reaction container 130, thereby improving the mixing of the specimen/reagent SR Further, the disk-shaped main body 101 rotates at the predetermined rotation angular velocity in the rotation direction based on the center axis, so that turbulence flow for a section of the flow of the specimen/reagent SR is formed in the channels arranged in a circumferential direction in the winding passage of the mixing channel 120 by the centrifugal force and Coriolis's force induced in the microfluidic unit including the aforementioned containers and channels, thereby maximizing the mixing of the specimen/reagent SR.

Next, as illustrated in FIG. 5C, the mixture M positioned in the reaction container 130 is analyzed.

Particularly, the mixture M dispensed in the mixing channel 120 is received in a region beginning from the region far from the mixing channel 120 in the receiving space inside the reaction container 130. Accordingly, excessive mixture O excessively received over the receiving space of the reaction container 130 is naturally transferred to the discharge container 140 connected to the reaction container 130, and the transferred excessive mixture O is received in the receiving space inside the discharge container 140.

Further, the mixture received in the reaction container 130 is reacted to each other after a predetermined time to be in a state in which the analysis is possible. In this case, photometric or colorimetric for the reacted mixture M received in the reaction container 130 is measured in a state where the disk-shaped main body 101 is stopped to conduct a quantitative analysis for a biochemical material. That is, after the predetermined time passes so that the mixture M in which the specimen/reagent SR is mixed is reacted, the biochemical assay is performed by measuring photometric or colorimetric of the mixture M.

As described above, the disk-shaped microfluidic system according to the first exemplary embodiment of the present invention including the microfluidic disk according to the second exemplary embodiment of the present invention, and the biochemical assay method according to the third exemplary embodiment of the present invention using the same prevent the specimen/reagent SR which is micro fluid from overflowing by using the blocking plate 112 and simultaneously mix the specimen/reagent SR through the mixing channel 120 connected to the receiving container 110, so that the mixture M of the specimen/reagent SR may be received in the reaction container 130 connected with the receiving container 110 to be reacted. That is, the biochemical assay for the micro fluid may be performed.

That is, the specimen/reagent SR may be smoothly injected inside the receiving container 110 through the opening 111, and the flow and the overflow of the micro fluid is prevented by the leaning phenomenon of the specimen/reagent SR by the centrifugal force. This affects as a factor of decreasing a time and an expense for the entire biochemical assay.

Hereinafter, a microfluidic disk according to the fourth exemplary embodiment of the present invention will be described with reference to FIG. 6.

Hereinafter, a part distinguished from the second exemplary embodiment will be extracted and described, and a part of which a description is omitted follows that of the second exemplary embodiment. Further, for convenience of description, in the fourth exemplary embodiment of the present invention, the same constituent element will be described by using the same reference numeral as that of the second exemplary embodiment of the present invention.

Figure 6:
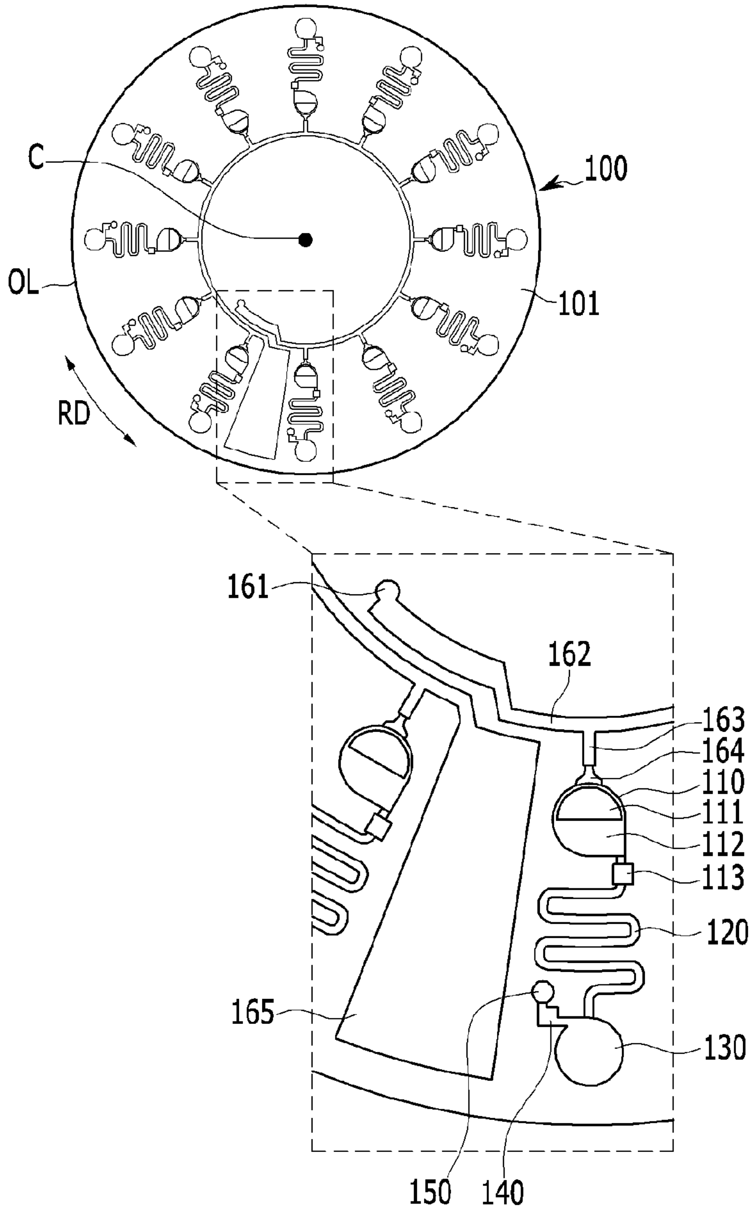
FIG. 6 is a diagram illustrating a microfluidic disk according to a fourth exemplary embodiment of the present invention.

FIG. 6 is a diagram illustrating the microfluidic disk according to the fourth exemplary embodiment of the present invention.

As shown in FIG. 6, the microfluidic disk 100 according to the fourth exemplary embodiment of the present invention includes the disk-shaped main body 101, an inlet 161, a distribution channel 162, a measuring container 163, a micro valve 164, a waste water container 165, a receiving container 110, a injection channel 113, a mixing channel 120, a reaction container 130, a discharge container 140, and an air outlet 150. The disk-shaped main body 101 may be provided with the inlet 161, the distribution channel 162, the measuring container 163, the micro valve 164, the waste waver container 165, the receiving container 110, the injection channel 113, the mixing channel 120, the reaction container 130, the discharge container 140, and the air outlet 150 by various mechanical chemical methods.

The inlet 161 is formed in the disk-shaped main body 101 while being adjacent to a center axis C, and is a passage through which a specimen, which is a micro fluid, is injected from the outside. The specimen is injected in the inlet 161 at a predetermined pressure by using a pipet, a cartridge, a pneumatic pump, and the like.

The distribution channel 162 is extended in a rotation direction RD from the inlet 161 while maintaining a predetermined distance from the center axis C, and is a passage through which the specimen passes. Particularly, the distribution channel 162 is connected with the inlet 161, and is disposed in a circumferential direction while maintaining a predetermined distance from the center axis C inside the disk-shaped main body 101. The distribution channel 162 is a passage through which the specimen supplied from the inlet 161 is received and transferred.

The measuring container 163 is extended in a direction of an outline of the disk-shaped main body 101 from the distribution channel 162, and receives the specimen passing through the distribution channel 162 at a predetermined volume. Particularly, the measuring container 163 is vertically connected to the distribution channel 162, and is disposed in a radial direction based on the center axis C. The specimen transferred through the distribution channel 162 is received in the measuring container 163 to be measured at a volume of the measuring container 163. The number of measuring containers 163 is plural, and each of the plurality of measuring containers 163 is spaced apart from each other at a predetermined interval to be extended in the direction of the outline of the disk-shaped main body 101 from the distribution channel 162.

The micro valve 164 is connected with an end of the measuring container 163 to connect the measuring container 163 and the receiving container 110, and open and close are adjusted in response to a rotation angular velocity of the disk-shaped main body 101. The micro valve 164 is disposed between the measuring container 163 and the receiving container 110 to limit a movement of the specimen during the measurement of the specimen by the measuring container 163 and allow the movement of the specimen during the transference of the measured specimen.

Particularly, the micro valve 164 connects the measuring container 163 and the receiving container 110 to adjust open and close according to the rotation angular velocity of the disk-shaped main body 101, in such a way that the open and the close of the micro valve 164 are adjusted according to a difference between first pressure formed at a vicinity of the micro valve 164 by centrifugal force according to rotation of the disk-shaped main body 101 and second pressure formed by surface tension inside the micro valve 164. For example, when the first pressure is larger than the second pressure, the micro valve 164 is opened so that the specimen moves from the measuring container 163 to the receiving container 110 through the micro valve 164, and when the second pressure is larger than the first pressure, the micro valve 164 is closed so that the specimen does not move from the measuring container 163 to the receiving container 110 through the micro valve 164.

Since the first pressure is proportional to the rotation angular velocity of the disk-shaped main body 101, the second pressure is adjusted to be larger than the first pressure during the measurement of the specimen, and the first pressure is adjusted to be larger than the second pressure after the measurement of the specimen by adjusting the rotation angular velocity of the disk-shaped main body 101, so that the open and the close of the micro valve 164 are adjusted in correspondence to each of the measurement and the after-measurement of the specimen by adjusting the rotation angular velocity of the disk-shaped main body 101. For example, the micro valve 164 may be closed when the disk-shaped main body 101 rotates at a first rotation angular velocity, and the micro valve 164 may be opened when the disk-shaped main body 101 rotates at a second rotation angular velocity larger than the first rotation angular velocity.

That is, the open and the close of the micro valve 164 are adjusted according to the rotation angular velocity of the disk-shaped main body 101. An end of the micro valve 164 connected with the receiving container 110 has a fan shape, and thus the flow of the specimen passing through the micro valve 164 is prevented from being discontinued.

The waste water container 165 is connected to an end of the distribution channel 162, and receives the specimen passing through the distribution channel 162. Particularly, the waste water container 165 is connected to the end of the distribution channel 162 farthest from the inlet 161, and receives the specimen transferred through the distribution channel 162 during the measurement of the specimen to be discharged. Another air outlet may be connected to the waste water container 165, and another air outlet may be a passage through which air occupied inside the waste water container 165 is discharged when the specimen is supplied to the waste water container 165.

The receiving container 110 is connected with the micro valve 164 to be positioned between the distribution channel 162 and the outline of the disk-shaped main body 101, and receives the specimen passing through the micro valve 164. The receiving container 110 forms a receiving space, and includes an opening 111 and a blocking plate 112 positioned at an upper side of the receiving space.

Each of the injection channel 113, the mixing channel 120, the reaction container 130, the discharge container 140, and the air outlet 150 are described in the microfluidic disk according to the second exemplary embodiment of the present invention.

Hereinafter, a biochemical assay method according to a fifth exemplary embodiment of the present invention will be described with reference to FIGS. 7 and 8.

The biochemical assay method according to the fifth exemplary embodiment of the present invention may be performed by using the disk-shaped microfluidic system according to the first exemplary embodiment of the present invention including the microfluidic disk according to the fourth exemplary embodiment of the present invention.

Figure 7:
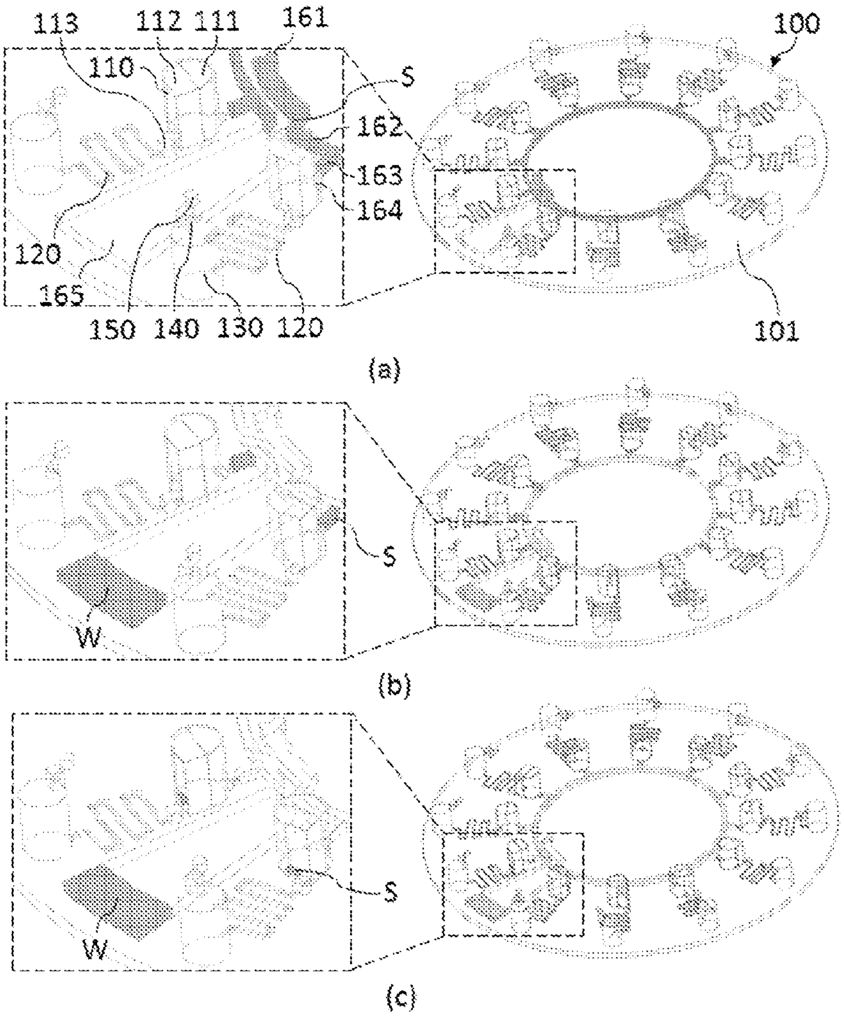
FIGS. 7 and 8 are drawings illustrating a biochemical assay method according to a fifth exemplary embodiment of the present invention.
Figure 8:
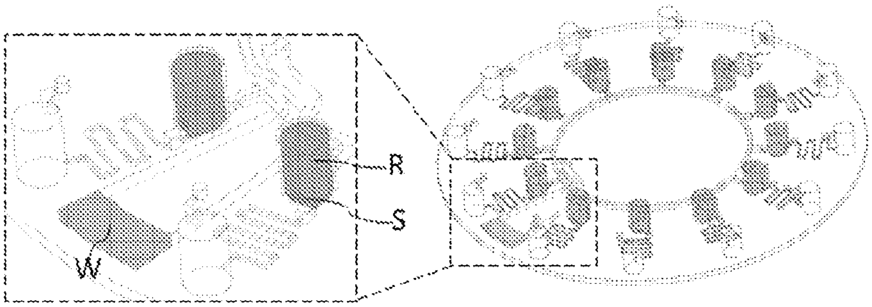
Figure 8:
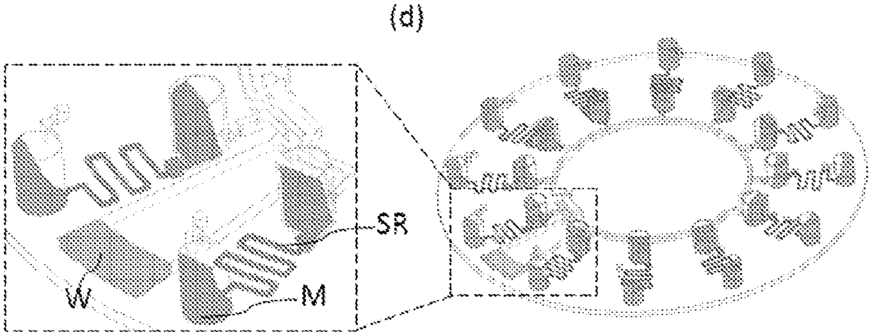
Figure 8:
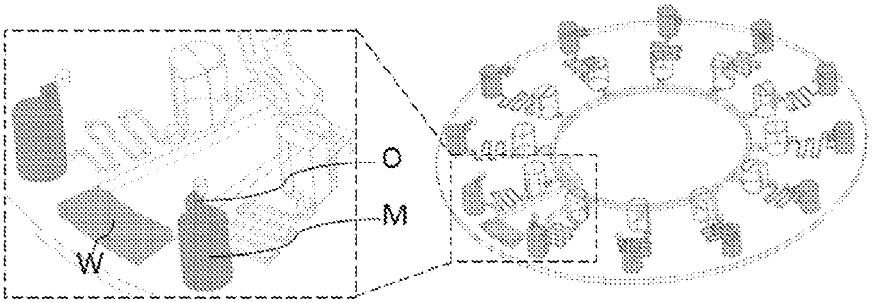

FIGS. 7 and 8 are diagrams illustrating the biochemical assay method according to the fifth exemplary embodiment of the present invention.

First, the disk-shaped microfluidic system according to the first exemplary embodiment of the present invention including the microfluidic disk according to the fourth exemplary embodiment of the present invention is provided.

Next, as illustrated in FIG. 7A, a specimen S is injected in the inlet 161.

Particularly, the specimen S is supplied to the distribution channel 162 through the inlet 161, and then supplied to the measuring container 163. In this process, a movement of the specimen S supplied inside the measuring container 163 by the micro valve 164 connected with the measuring container 163 to the receiving container 110 is limited.

Next, as illustrated in FIG. 7B, the specimen S is measured by rotating the disk-shaped main body 101 at the first rotation angular velocity.

Particularly, the specimen S injected in the distribution channel 162 is transferred along the distribution channel 162 by centrifugal force induced by the rotation of the disk-shaped main body 101 in the rotation direction to be received in the waste water container 165. In this process, a doctor-blade effect is induced by the centrifugal force in a connection surface of the distribution channel 162 and the measuring container 163 by a structural effect of the measuring container 163 vertically connected with the distribution channel 162, so that the specimen S supplied inside the distribution channel 162 and the specimen S supplied inside the measuring container 163 is disconnected. Accordingly, the specimen S at a receivable volume is automatically measured by the measuring container 163. Further, in this process, the transference of the specimen S supplied to the measuring container 163 to the receiving container 110 is still limited by the micro valve 164. As a result, the specimen S is in a state where the specimen S supplied to the distribution channel 162 is discharged to the waste water container 165 to be received in the waste water container 165 as waste water W, and the specimen S is left only in the measuring container 163.

Next, as illustrated in FIG. 7C, the micro valve 164 is opened by rotating the disk-shaped main body 101 at the second rotation angular velocity larger than the first rotation angular velocity, so that the measured specimen S is received in the receiving container 110.

Particularly, the specimen S measured by the measuring container 163 is allowed to pass through the micro valve 164 to be transferred to the receiving container 110 by rotating the disk-shaped main body 101 at the second rotation angular velocity larger than the first rotation angular velocity that is the rotation angular velocity at the time of the measurement of the micro specimen. As a result, the specimen S measured by the measuring container 163 is transferred to and received in the receiving container 110. In this process, since the end of the micro valve 164 connected with the receiving container 110 has the fan shape, the specimen S passing through the micro valve 164 is smoothly transferred to the receiving container 110 without the disconnection of the flow of the specimen S. The specimen S received in the receiving container 110 is moved to another disk-shaped microfluidic system connected with the receiving container 110 or moved to another channel or container connected with the receiving container 110, so that a micro flow test for the micro specimen may be performed. In the meantime, when the micro valve 164 has a rod shape, a flow of the specimen S passing through the micro valve 164 is disconnected by the centrifugal force, so that a partial specimen S may be left in the measuring container 163.

Next, as illustrated in FIG. 8D, a reagent R for the biochemical assay is injected in the receiving container 110 through the opening 111.

Particularly, in a state where the disk-shaped main body 101 is stopped, the reagent R for the biochemical assay is injected in the receiving space inside the receiving container 110 through the opening 111 by using a device, such as a syringe and a pipet, or the reagent R is injected in the receiving space inside the receiving container 110 through the opening 111 in a form of droplet by using an automatic distributor, and the like.

Next, as illustrated in FIG. 8E, the disk-shaped main body 101 is rotated at a third rotation angular velocity.

Particularly, the specimen/reagent SR injected in the receiving container 110 is mixed through the mixing channel 120 by rotating the disk-shaped main body 101 at the predetermined rotation angular velocity to position a mixture M in the reaction container 130. The specimen/reagent SR injected in the receiving container 110 leans in a direction far from the center axis by centrifugal force induced by the rotation of the disk-shaped main body 101 at the predetermined rotation angular velocity in the rotation direction RD based on the center axis C. In this case, the specimen/reagent SR positioned at an upper end of the receiving container 110 tends to overflow into the outside of the receiving container 110 by the leaning phenomenon, but flowage of the specimen/reagent SR is prevented by the blocking plate 112 positioned at the upper side of the receiving container 110. The specimen/reagent SR positioned at a lower end of the receiving container 110 is discharged through the injection channel 113 connected to the receiving container 110 by the leaning phenomenon.

That is, pressure or electromagnetic force may be applied from the outside or the disk-shaped main body 101 is self-rotated based on the center axis to induce centrifugal force in the microfluidic unit, so that the specimen/reagent SR received inside the receiving container 110 is injected to the mixing channel 120 through the injection channel 113 connected to the receiving container 110. The specimen/reagent SR injected to the mixing channel 120 through the injection channel 113 in the receiving container 110 is mixed together while passing through the mixing channel 120. The mixture M of the mixed specimen/reagent SR is received in the reaction container 130 connected to an end of the mixing channel 120.

Further, a 3D stirring phenomenon is generated while the specimen and the reagent rapidly flow in a corner channel in the winding passage of the mixing channel 120, so that mixing of the specimen/reagent SR is induced. Further, when the mixture M is received in the reaction container 130 connected to the end of the mixing channel 120, the previously received mixture M and dispensed specimen/reagent SR collide with each other while the specimen/reagent SR is dispensed from the mixing channel 120 to the reaction container 130, thereby improving the mixing of the specimen/reagent SR. Further, the disk-shaped main body 101 rotates at the predetermined rotation angular velocity in the rotation direction based on the center axis, so that turbulence flow for a section of the flow of the specimen/reagent SR is formed in the channels arranged in a circumferential direction in the winding passage of the mixing channel 120 by the centrifugal force and Coriolis's force induced in the microfluidic unit including the aforementioned containers and channels, thereby maximizing the mixing of the specimen/reagent SR.

Next, as illustrated in FIG. 8F, the mixture M positioned in the reaction container 130 is analyzed.

Particularly, the mixture M dispensed in the mixing channel 120 is received in a region beginning from a region far from the mixing channel 120 in the receiving space inside the reaction container 130. Accordingly, excessive mixture O excessively received over the receiving space of the reaction container 130 is naturally transferred to the discharge container 140 connected to the reaction container 130, and the transferred excessive mixture O is received in the receiving space inside the discharge container 140.

Further, the mixture M received in the reaction container 130 is reacted to each other after a predetermined time to be in a state in which the analysis is possible. In this case, photometric or colorimetric for the reacted mixture M received in the reaction container 130 is measured in a state where the disk-shaped main body 101 is stopped to conduct a quantitative analysis for a biochemical material. That is, after the predetermined time passes so that the mixture M in which the specimen/reagent SR is mixed is reacted, the biochemical assay is performed by measuring photometric or colorimetric of the mixture M.

Hereinafter, an experimental example confirming the biochemical assay method according to the fifth exemplary embodiment of the present invention using the disk-shaped microfluidic system according to the first exemplary embodiment of the present invention including the microfluidic disk according to the fourth exemplary embodiment of the present invention will be described with reference to FIG. 9.

Figure 9:
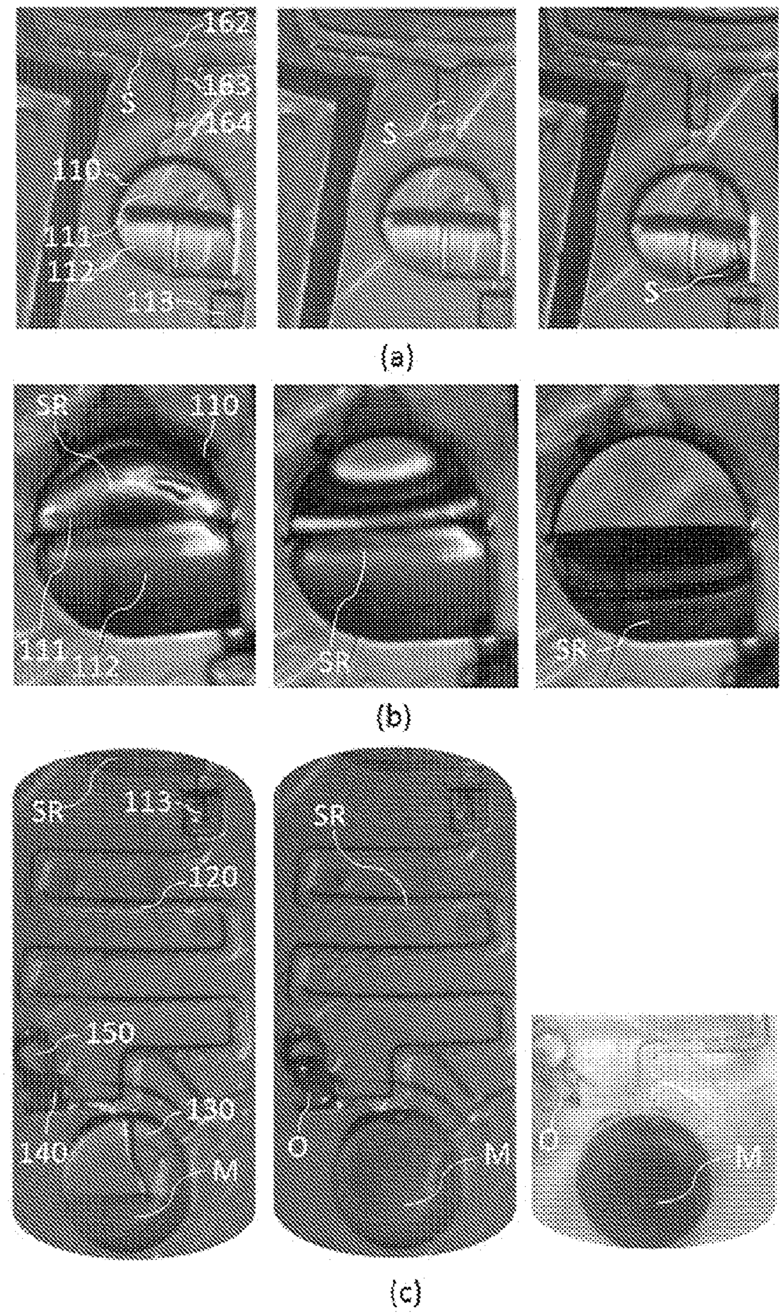
FIG. 9 is a picture for describing an experimental example confirming the biochemical assay method according to the fifth exemplary embodiment of the present invention.

FIG. 9 is a picture for describing the experimental example confirming the biochemical assay method according to the fifth exemplary embodiment of the present invention.

As illustrated in FIG. 9A, it is seen that the specimen S injected through the inlet 161 is supplied to the distribution channel 162 and the measuring container 163, and the transference of the specimen S supplied to the measuring container 163 during the process is limited by the micro valve 164. The specimen S supplied to the distribution channel 162 is discharged to be received in the waste water container 165 by centrifugal force induced by the rotation of the disk-shaped main body. Simultaneously, the specimen S supplied to the measuring container 163 is separated from the specimen S supplied to the distribution channel 162 to be measured at a volume received in the measuring container 163 and left. It is seen that in this process, the transference of the specimen S measured in the measuring container 163 is limited by the micro valve 164. It is seen that the specimen S measured by the measuring container 163 passes through the micro valve 164 to be transferred to and received in the receiving container 110 by rotating the disk-shaped main body 101 at a rotation angular velocity larger than a rotation angular velocity during the measurement of the micro fluid.

As illustrated in FIG. 9B, a reagent is injected inside the receiving container 110 through the opening 111 disposed in an upper surface of the receiving container 110. It is seen that in this process, a pressure different formed inside the specimen/reagent SR is insufficient by gravity, so that the specimen S and the reagent R are not discharged to the injection channel 113 connected to the receiving container 110. The specimen/reagent SR injected inside the receiving container 110 leans in a direction far from the center axis C by centrifugal force induced by the rotation of the disk-shaped main body. It is seen that in this case, the specimen/reagent SR positioned at an upper end of the receiving container 110 tends to overflow into the outside of the receiving container 110 by the leaning phenomenon, but flowage of the specimen/reagent SR is prevented by the blocking plate 112 positioned at the upper side of the receiving container 110. It is seen that overflow of the specimen/reagent SR positioned at the upper end of the receiving container 110 to the outside of the receiving container 110 is continuously prevented by the blocking plate 112, and the specimen/reagent SR positioned at a lower end of the receiving container 110 is simultaneously injected in the mixing channel 120 through the injection channel 113 by the leaning phenomenon.

As illustrated in FIG. 8C, it is seen that the specimen/reagent SR positioned in the receiving space inside the receiving container 110 is injected to the mixing channel 120 through the injection channel 113 by the centrifugal force induced by the rotation of the disk-shaped main body, and the injected specimen/reagent SR is mixed together and the mixture M is received in the receiving space inside the reaction container 130. It is seen that the excessive mixture O excessively received over the receiving space inside the reaction container 130 is naturally transferred from an upper side of the reaction container 130 to the discharge container 140 connected to a region close to the center axis C of a microfluidic substrate main body 103, and the transferred excessive mixture O is received in the receiving space inside the discharge container 140. It is seen that the mixture M received in the receiving space inside the reaction container 130 is reacted with each other after a predetermined time passes, to be in a state where photometric or colorimetric thereof may be identified.

As described above, the biochemical assay method according to the fifth exemplary embodiment of the present invention using the disk-shaped microfluidic system according to the first exemplary embodiment of the present invention including the microfluidic disk according to the fourth exemplary embodiment of the present invention may perform a quantitative analysis for a biochemical material by measuring the specimen S injected through the inlet 161 by using the measuring container 163 at a target volume by using the doctor-blade effect for measuring a tiny amount of specimens S, injecting the reagent R in the specimen S measured in the receiving container 110, mixing the specimen S and the reagent R in the mixing channel 120, and then measuring photometric or colorimetric of the mixture M reacted by reacting the mixture M in the reaction container 130.

That is, the biochemical assay method according to the fifth exemplary embodiment of the present invention using the disk-shaped microfluidic system according to the first exemplary embodiment of the present invention including the microfluidic disk according to the fourth exemplary embodiment of the present invention may accurately and efficiently measure a tiny amount of specimens S, smoothly inject the reagent R for the biochemical assay, prevent flowage of the specimen/reagent SR by the leaning phenomenon of the micro fluid, induce effective mixing of the specimen/reagent SR, and perform a quantitative analysis for a biochemical material through the measurement of photometric or colorimetric of the mixture M by receiving and reacting the mixture M. This affects as a factor by which a small amount of blood is used in order to identify a biochemical material inside the specimen, and a factor by which efficiency of various biochemical assays for a specific specimen, such as specific plasma, is improved.

In brief, the biochemical assay method according to the fifth exemplary embodiment of the present invention using the disk-shaped microfluidic system according to the first exemplary embodiment of the present invention including the microfluidic disk according to the fourth exemplary embodiment of the present invention, by which a small amount of blood is used in order to identify a biochemical material inside the specimen, and efficiency of various biochemical assays for a specific specimen is simultaneously improved, is provided.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of Symbols>

Disk-shaped main body 101, Receiving container 110, Injection channel 113, Mixing channel 120, Reaction container 130, Discharge container 140

What is claimed is:

1. A microfluidic disk, comprising:

a disk-shaped main body self-rotating based on a center axis;

an inlet formed in the disk-shaped main body and adjacent to the center axis, through which a micro fluid is injected;

a distribution channel extended in a rotation direction from the inlet while maintaining a predetermined distance from the center axis, wherein the micro fluid passes through the distribution channel;

a measuring container extended in a direction of an outline of the disk-shaped main body from the distribution channel, and configured to receive a predetermined volume of the micro fluid;

a micro valve connected to an end of the measuring container, wherein opening and closing of the micro valve are controlled in response to a rotation angular velocity of the disk-shaped main body;

a receiving container connected with the micro valve and positioned between the distribution channel and the outline of the disk-shaped main body to receive the micro fluid passing through the micro valve, recessed from a surface of the disk-shaped main body to have an opening at an upper side and a blocking plate for blocking one region of the opening at an upper side thereof;

an injection channel communicating with a lower side of the receiving container, and extended in a direction of the outline from the disk-shaped main body from an inside of the receiving container;

a mixing channel communicating with the injection channel, and bent at least once to be extended in the direction of the outline of the disk-shaped main body;

a reaction container positioned between the mixing channel and the outline of the disk-shaped main body, and having one portion communicating with the mixing channel; and a discharge container communicating with the other portion of the reaction container.

2. The microfluidic disk of claim 1, wherein:

the blocking plate is positioned at a side of the outline of the disk-shaped main body in an entire region of the opening.

3. The microfluidic disk of claim 2, wherein:

the blocking plate blocks a ⅓ region to ⅔ region in the entire region of the opening.

4. The microfluidic disk of claim 1, further comprising:

an air outlet connected with the discharge container.

5. The microfluidic disk of claim 1, wherein:

the micro valve connected with the receiving container has an end shaped like a fan.

6. The microfluidic disk of claim 1, wherein:

the micro valve is closed when the disk-shaped main body rotates at a first rotation angular velocity, and is opened when the disk-shaped main body rotates at a second rotation angular velocity that is greater than the first rotation angular velocity.

7. The microfluidic disk of claim 1, wherein:

the measuring container comprises a plurality of measuring containers; and each of the plurality of measuring containers is spaced apart from each other at a predetermined interval to be extended from the distribution channel.

8. A method for a biochemical assay, comprising:

providing a microfluidic system comprising the microfluidic disk of claim 1;

injecting a specimen through the inlet;

measuring the specimen by rotating the disk-shaped main body at a first rotation angular velocity such that the specimen passes through the distribution channel from the inlet to be positioned only in the measuring container;

receiving the measured specimen in the receiving container by opening the micro valve by rotating the disk-shaped main body at a second rotation angular velocity that is greater than the first rotation angular velocity;

injecting the specimen and a reagent in the receiving container through the opening;

mixing the specimen and the reagent injected in the receiving container through the mixing channel by rotating the disk-shaped main body at a predetermined rotation angular velocity to position a mixture in the reaction container; and analyzing the mixture positioned in the reaction container.

9. The method of claim 8, wherein:

the analyzing of the mixture is performed by measuring photometric or colorimetric of the mixture after a predetermined time passes so that the specimen and the reagent are reacted.

10. A microfluidic unit, comprising:

an inlet through which a micro fluid is injected from outside;

a distribution channel extended in a rotation direction from the inlet, wherein the micro fluid passes through the distribution channel;

a measuring container extended from the distribution channel, and configured to receive a predetermined volume of the micro fluid;

a micro valve connected to an end of the measuring container, wherein the micro valve is closed during measurement of the micro fluid by the measuring container;

a receiving container connected with the micro valve to receive the micro fluid passing through the micro valve, the receiving container including an opening and a blocking plate configured to block one region of the opening at an upper side thereof;

an injection channel communicating with a lower side of the receiving container, and extended outwardly from an inside of the receiving container;

a mixing channel communicating with the injection channel, and bent at least once to be extended;

a reaction container having one portion communicating with the mixing channel; and a discharge container communicating with the other portion of the reaction container.

11. A microfluidic disk, comprising:

a disk-shaped main body self-rotating in a rotation direction based on center axis;

an inlet formed in the disk-shaped main body while being adjacent to the center axis, through which a micro fluid is injected from the outside;

a distribution channel extended in the rotation direction from the inlet while maintaining a predetermined distance from the center axis, through which the micro fluid passes;

a measuring container extended in a direction of an outline of the disk-shaped main body from the distribution channel and configured to receive the micro fluid at a predetermined volume;

a micro valve connected to an end of the measuring container, of which open and close is adjusted in response to a rotation angular velocity of the disk-shaped main body;

a waste water container connected to an end of the distribution channel and configured to receive the micro fluid;

a receiving container connected with the micro valve to be positioned between the distribution channel and the outline of the disk-shaped main body to receive the micro fluid passing through the micro valve, and recessed from a surface of the disk-shaped main body to include an opening and a blocking plate configured to block one portion of the opening at an upper side thereof;

an injection channel communicating with a lower side of the receiving container, and extended in a direction of the outline of the disk-shaped main body from an inside the receiving container;

a mixing channel communicating with the injection channel, and bent one or more times to be extended in the direction of the outline of the disk-shaped main body;

a reaction container positioned between the mixing channel and the outline of the disk-shaped main body, and having one portion communicating with the mixing channel; and a discharge container communicating with the other portion of the reaction container.

12. The microfluidic disk of claim 11, wherein:

the micro valve connected with the receiving container has an end shaped like a fan.

13. The microfluidic disk of claim 11, wherein:

the micro valve is closed when the disk-shaped main body rotates at a first rotation angular velocity, and is opened when the disk-shaped main body rotates at a second rotation angular velocity larger than the first rotation angular velocity.

14. The microfluidic disk of claim 11, further comprising:

an air outlet connected to each of the waste water container and the discharge container.

15. The microfluidic disk of claim 11, wherein:

the number of measuring containers is plural, and each of the plurality of measuring containers are spaced apart from each other at a predetermined interval to be extended from the distribution channel.

16. A method for a biochemical assay, comprising:

providing a microfluidic system comprising the microfluidic disk of claim 11;

injecting a specimen in the inlet;

measuring the specimen by rotating the disk-shaped main body at a first rotation angular velocity so that the specimen passes through the distribution channel from the inlet to be positioned only in the measuring container;

receiving the measured specimen in the receiving container by opening the micro valve by rotating the disk-shaped main body at a second rotation angular velocity larger than the first rotation angular velocity;

injecting a reagent in the receiving container through the opening;

mixing the specimen and the reagent injected in the receiving container through the mixing channel by rotating the disk-shaped main body at a predetermined third rotation angular velocity to position a mixture in the reaction container; and analyzing the mixture positioned in the reaction container.

17. The method of claim 16, wherein:

the analyzing of the mixture is performed by measuring photometric or colorimetric of the mixture after a predetermined time passes so that the specimen and the reagent are reacted.

* * * * *